United States Patent Office 3,000,859
Patented Sept. 19, 1961

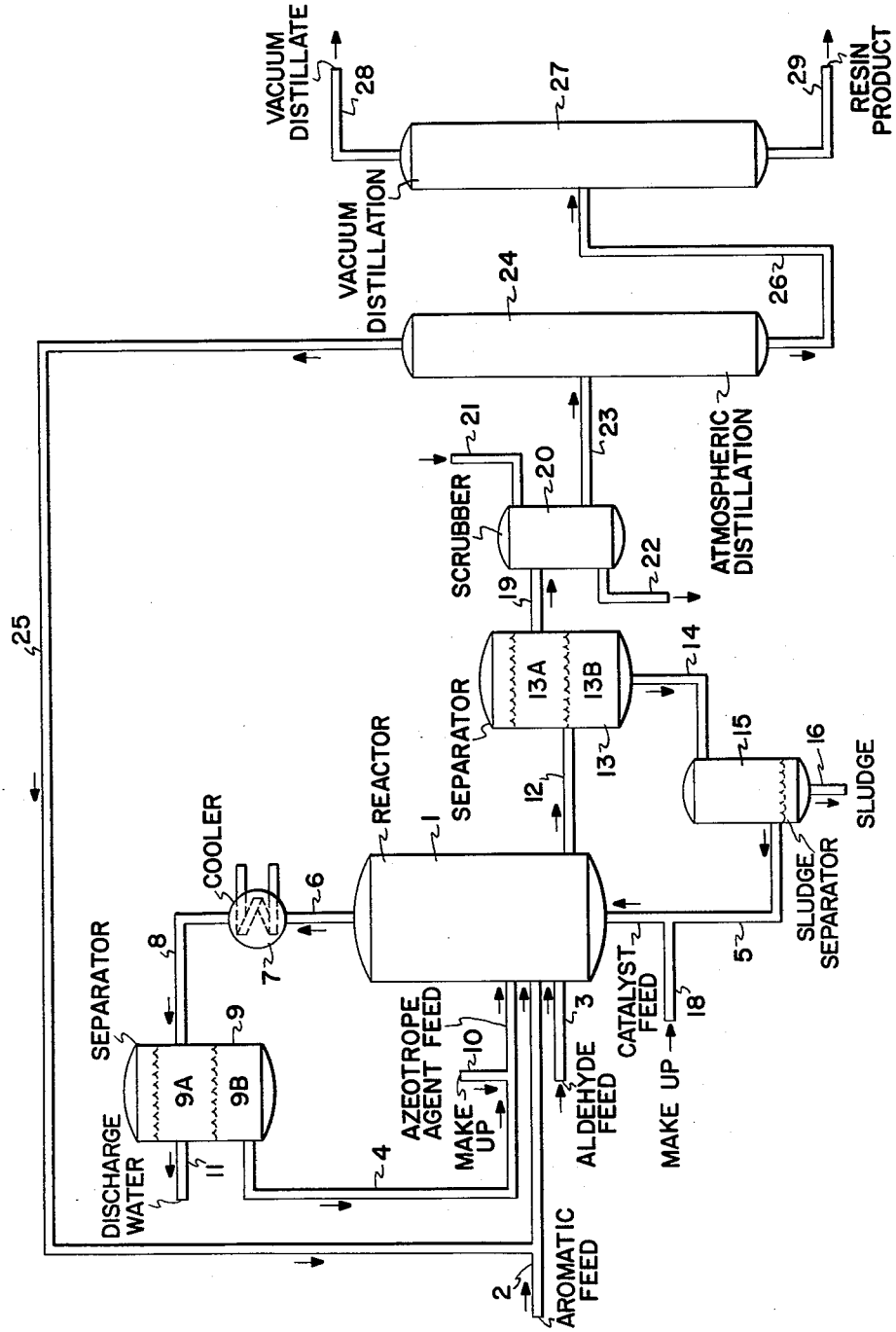

3,000,859
PREPARATION OF RESINS FROM AROMATICS AND ALDEHYDES
Stanley B. Mirviss, Roselle, and Ober C. Slotterbeck, Rahway, N.J., assignors to Esso Research and Engineering Company, a corporation of Delaware
Filed Dec. 12, 1956, Ser. No. 627,913
5 Claims. (Cl. 260—67)

The present invention relates to a process for the production of resins by condensation of aromatics and aldehydes. More particularly, it relates to an improvement obtained by the removal of the water of condensation by azeotropic distillation.

It is known in the art that useful thermoplastic resins can be prepared from aromatic hydrocarbons and aldehydes in the presence of an acid or metal halide catalyst. These resins can be produced from aromatics such as toluene, naphthalene, phenanthrene, and other poly benzenoid aromatic hydrocarbons, and their alkyl substituted derivatives, which have at least two free positions on the ring and are not subject to steric hindrance. The preferred aromatics might be defined as alkyl substituted aromatics of 1 to 3 rings, having up to 4 alkyl substituents per ring and up to about 4 carbon atoms per substituent. The aromatics with more alkyl substitution are the more reactive monomers, with xylene and methyl naphthalenes the most widely used. Other useful alkyl benzenes are toluene, ethyl benzene, isopropyl benzene, diisobutylbenzenes, etc. Hence, these more preferred compounds may be described as alkyl substituted benzenes having 1 to 4 alkyl substitutents of up to about 4 carbon atoms each. Mixtures of aromatic hydrocarbons may be used also per se or in admixture with naphthenes and/or paraffins. Illustrative of such mixtures are distillates and bottom cuts from cracking operations and streams from extraction or extractive distillation operations using phenol, furfural, sulfur dioxide, and the like as extractants.

Formaldehyde is the most generally used aldehyde in the polymerization reaction, although most every aldehyde—acyclic, cyclic, heterocyclic, saturated, unsaturated, or halogenated—is a feasible reactant. Illustrative examples of useful aldehydes include saturated aliphatic aldehydes of 1 to 4 carbon atoms such as formaldehyde, acetaldehyde and butyraldehyde, unsaturated aldehydes such as crotonaldehyde, heterocyclic aldehydes such as furfural, chlorinated aldehydes such as chloral, etc.

The catalyst most frequently used is sulfuric acid, preferably concentrated sulfuric acid. However, other acid-acting condensation catalysts such as formic acid, zinc chloride in acetic acid, hydrofluoric acid, hydrochloric acid, Friedel-Crafts catalysts such as boron trifluoride and its complexes (e.g., boron trifluoride etherate), aluminum chloride, ferric chloride, dilute phosphoric acid, sulfonated polystyrene resins (e.g. Dowex 50-X8), acidic clays, ether-acid combinations (e.g., sulfuric acid in isopropyl ether), may be used likewise.

The product resins of this process have usually been brittle and thermoplastic, with softening points up to 300° F. or better depending upon the particular aromatic hydrocarbon and/or aldehyde and the molar ratio of one to the other. The better resins generally contain less than 3% oxygen, are neutral, and give essentially no ash. The resins are resistant to oxygen, alkali, and acid, and they are soluble in the higher alcohols, hydrocarbons, drying oils, ketones, etc. These properties can be changed, however, by certain modifying methods such as including phenols, alcohols, acids, anhydrides, etc. in the resin synthesis reaction mixture or subsequently treating the resins with these materials. The various resins have been useful as plasticizers, hot melt coatings, in floor tile, insecticides, fungicides, vinyl insulating compounds, wire coatings, records, moldings, adhesives, sealing compounds, inks, pours, varnishes, high temperature lubricants, and so forth.

Azeotropic distillation of water, of course, is a well-known operation, also. Such an operation consists essentially of the removal of water from a water-containing mixture by the addition of a water azeotroping agent and the subsequent removal of the resulting water azeotrope by conventional distillation. Any compound which will form an azeotrope with water and which is inert in the reaction under the prevailing conditions will serve as a suitable azeotropic agent, but, of course, it is preferable to use an agent which will form an azeotrope boiling below that of the other components in the original mixture.

The main object of this invention is to provide a process for the production of resins from aromatics and aldehydes wherein the catalyst requirement is economically reduced. Another object is to overcome the heretofore prevailing emulsification difficulties due to side reactions resulting from the presence of excess acid. Still other objects are to eliminate oxidation reactions, eliminate or reduce the use of diluents, and increase resin quality. A further object is to provide a continuous operation for such resin synthesis by preventing the usual deactivation of the catalyst by water formed in the reaction.

The attached schematic drawing illustrates a continuous process embodying the present invention and will be discussed more fully hereinafter.

In condensing aromatics with aldehydes, one molecule of water is formed for each aldehyde molecule reacted, and thus the amount of water present increases as the reaction proceeds and resin forms. This build-up of water tends to dilute the catalyst, thereby necessitating the use of excess catalyst in the reaction mixture in order to keep the active catalyst concentration sufficiently high. Up to 150 wt. percent $H_2SO_4$ based on the total feed, and even more of other less active acid catalysts, have been used. Several disadvantages are inherent with the above-described prior method.

First, this additional acid is costly. Secondly, the water of condensation must be removed from the reaction mixture following each intermittent batch reaction. This dehydration step is another added expense and highly undesirable. Thirdly, the excess acid causes side reactions leading to severe emulsification difficulties in the product work-up following the above-mentioned dehydration step. Emulsions are formed during the product washing steps, and cannot be readily broken by such physical means as centrifuging or addition of soluble salts. For instance, sulfuric acid emulsifies with the polymer layer and cannot be easily separated therefrom. Metal halides alone or in complexes or solutions, and organic and inorganic acids alone or in combination with modifying agents are likewise difficult to separate. These catalysts must be removed, therefore, as much as possible by washing with water, dilute alkali, etc., thereby necessitating a second dehydration step to reactivate the separated catalyst. Fourthly, oxidation and other side reactions are caused by the large quantities of acid catalyst, thereby leading to contamination of the product with color-forming bodies, lowering of softening points, and charring of the aldehyde which lowers resin yields.

The difficulties due to side reactions have been partially overcome by the inclusion of various modifying agents or diluents, such as phenols, alcohols, acids, anhydrides, ketones, etc. within the reaction mixture. These organic oxy-compounds, however, besides being costly, also have a definite shortcoming in that they often cause partial destruction of catalyst activity, thereby further increasing the catalyst requirement. Similarly, it has been necessary to employ large quantities of metallic halides, such as zinc chloride, generally in high dilution in an acid solvent, e.g., a 10% solution of zinc chloride in acetic acid.

It has now been discovered that, by removing the water of condensation by azeotropic distillation in the course of the aforedescribed aromatic-aldehyde resin synthesis, the normal catalyst requirement can be greatly reduced, without any need for including diluents or modifying agents in the reaction mixture to prevent side reactions. Unlike in prior uses of azeotropic distillation, the invention does not employ azeotropic distillation to dry or separate the resin in the reaction mixture, nor to shift the equilibrium of the reaction since the condensation reaction is not reversible. Rather, the invention here is the use of a water azeotroping agent to remove the water of condensation as a novel means of maintaining a high concentration of the active acid catalyst, thereby permitting much smaller quantities of acid to be employed to attain yields equal to those of the prior art. Conversely, if the same quantity of catalyst as the prior art is used, much higher product yields are attained. As a result, not only a saving on catalyst is obtained, but the side reactions causing emulsification difficulties, contamination with color-forming bodies, etc., are essentially prevented. The diluents and modifiers formerly employed to reduce the undesirable effect of the excessive amount of active acid catalyst are no longer necessary, and thus also the tendency of these agents to diminish catalyst activity is avoided. Other advantages such as continuous operation and elimination of expensive dehydration steps are also realized.

The general procedure of the present invention can be said to consist essentially of five major steps. The aromatic and the aldehyde, along with the catalyst, the azeotroping agent, and the diluent, if any, are charged to the reaction zone where the condensation polymerization takes place, and wherefrom the water of condensation is removed by the azeotroping agent as the reaction proceeds. The reaction mixture is then removed to a separation zone where the acid layer settles as a lower layer from the hydrocarbons. The third step consists of washing the hydrocarbon layer with water, or the like, in a washing zone. Fourthly, the washed hydrocarbons are distilled at atmospheric pressure, from which zone the unreacted aromatics are removed at the top and the product mixture at the bottom. Finally, the product mixture is fed to a vacuum distillation zone where the light distillate, or fill, i.e., liquid polymer boiling between initial boiling point of desired resin and final boiling point of starting aromatic, is withdrawn from the top and the aromatic-aldehyde resin, the desired material, is recovered at the bottom of said zone. When in continuous operation, the various streams such as the acid layer, the unreacted aromatic, and the fill may be recycled for further processing.

With respect to the present invention, the feed aromatics and aldehydes from which the resins may be produced are the same as those in the prior art and described earlier herein with the exception that durene was found to be a feasible aromatic herein. Likewise, the catalysts used in the present invention are primarily those previously known and described earlier herein. In addition, however, and unlike in the prior art where 85% phosphoric acid was found relatively inactive and has not been widely used, 100% phosphoric acid has been found quite surprisingly effective in the present process. Aromatic sulfonic acids, such as para-toluene sulfonic acid and benzene sulfonic acid are also most unexpectedly desirable in that they provide condensation reactions wherefrom pure catalyst is easily removed in good yield by the physical means of crystallization and filtration. The preferred species is any acid catalyst which contains an active —$SO_3H$ group, such as sulfuric acid, aryl sulfonic acids, and sulfonated polystyrene (e.g., Dowex 50–X8 resin), the most preferred of which is sulfuric acid.

For proper operation it is necessary to use a water azeotroping agent which will form a binary azeotrope boiling about the chosen reaction temperature, but preferably below the boiling point temperatures of the aromatic and aldehyde feed components themselves and their azeotropes with water or the added azeotroping agent. Low molecular weight, $C_1$ to $C_3$, chlorinated hydrocarbons such as carbon tetrachloride or trichloroethylene may be used as suitable azeotroping agents. Polychlorinated aromatics, such as dichlorobenzenes, saturated cyclic and acyclic hydrocarbons, and cyclic and acyclic ethers, such as dioxane and dibutyl ether, may also be employed. Benzene is particularly suitable when the aromatic feed consists of poly-alkylated benzenes or polynuclear aromatics such as naphthalene since benzene is essentially inert as a reactant aromatic relative to the aromatic feed under the conditions of condensation cited herein.

The present invention provides a process readily amenable to continuous operation, since catalyst life is extended and separate catalyst dehydrating operations are no longer necessary. Only a relatively small amount of azeotroping agent need be added during the operation, for only the small amount contained in the discarded aqueous phase of the condensed azeotrope distillate is lost.

The operation continuous, semi-continuous, or batchwise, is carried out at a temperature between 75 and 320° F., preferably between 120 and 250° F., and at a pressure usually atmospheric, but up to 500 p.s.i.g. The aromatic/aldehyde molar ratio is maintained between 5:1 and 1:5, preferably between 2:1 and 1:2, and acid catalyst is employed in an amount of about 0.2 to 20% based on the total reactive charge, i.e., aromatic and aldehyde, preferably 0.5 to 5% in the case of sulfuric acid. An amount of water azeotroping agent in the range of 1 to 20%, preferably 5 to 10%, on the same basis, is normally used.

A typical continuous process operating in accordance with this invention will now be briefly described with reference to the attached diagrammatic drawing. It is to be understood that the process shown is but an illustration and in no way limits the scope of the invention.

Equimolecular proportions of an aromatic hydrocarbon, e.g., toluene, and an aldehyde, e.g., butyraldehyde, are charged to the reaction zone 1 via lines 2 and 3, respectively. The azeotroping agent, e.g., carbon tetrachloride, is fed by line 4 in a proportion of about 20% of the total reactant charge and the acid catalyst, e.g., sulfuric acid, by line 5 in a proportion of about 2% of the total reactant charge.

During the polymerization reaction, which is maintained at a temperature of about 180 to 200° F., the water of condensation continuously forms an azeotrope with the carbon tetrachloride, vaporizes as such, and is withdrawn through line 6.

The azeotrope vapors are condensed and cooled in cooler 7 and passed via line 8 to separator 9. In the latter, the carbon tetrachloride separates as the lower layer 9B and is recycled to reactor 1 via feed line 4. Makeup carbon tetrachloride is introduced through line 10. Upper layer 9A consists essentially of water and is discharged by line 11, with only slight losses of carbon tetrachloride.

The reaction mixture is withdrawn from reactor 1 to separator 13 by line 12, where the mixture separates into layers 13A and 13B. The lower sulfuric acid layer 13B leaves the separator through line 14, enters separator 15 where sludge is removed through line 16, and is recycled to reactor 1 by line 5. Make-up acid is introduced by line 17.

The aromatic-aldehyde hydrocarbon layer 13A continues from separator 13 to scrubber 20 via line 19. An alkali wash stream flows countercurrently to the hydrocarbon stream, said wash stream entering the scrubber by line 21 and leaving with impurities by line 22. The washed hydrocarbons are withdrawn through line 23 at a point above line 22.

Line 23 issues the hydrocarbons into atmospheric distillation zone 24, where the lighter unreacted aromatics are removed overhead by line 25, and the reaction products are withdrawn as bottoms through line 26. The unreacted toluene is recycled via line 25 to line 2 where it joins fresh toluene and is charged to reactor 1.

Finally, the product in line 26 is sent to vacuum distillation zone 27. Here the product is vacuum distilled at 2 to 4 mm. Hg and about 500° F. so that the lighter distillate, or fill, is substantially completely removed via line 28, and the desired higher-melting toluene-butyraldehyde resin is recovered through line 29. The vacuum distillate, or fill, may be recycled to reaction zone 1 or further processed by other means to give additional satisfactory product resin.

To further illustrate the nature, operation and advantages of the present invention, the following examples are included. Unless otherwise indicated, all percentages and ratios of materials are given throughout the specification, examples, and claims on a weight basis.

EXAMPLE I

Five batch runs were made in accordance with the aforedescribed procedural steps in order to compare the previously known art of making aromatic-aldehyde resins with the present invention. The following Table I shows the data obtained for these runs, in which xylene was reacted with paraformaldehyde to form the corresponding resin.

Runs 1 and 2, of Table I below, are typical of the prior art wherein large amounts of acid catalyst and addition of large quantities of diluents such as heptane and isopropyl alcohol to the aqueous washing steps are necessary to minimize emulsification. Furthermore, only a small proportion of the sulfuric acid used could be separated from the reaction mixture as a lower layer upon standing. Considerable black charred unreacted formaldehyde was present in the reaction mixture, also. Run 1, which uses more acid catalyst than run 2, is superior with respect to resin yield. Still greater amounts of acid result in a darker resin color and even greater emulsification difficulty. By contrast, run 3, analogous to runs 1 and 2, by using benzene as an azeotroping agent pursuant to this invention requires only one-fifth as much acid without sacrificing resin yield and, at the same time, gives a resin having a substantially higher softening point and an improved color. A higher yield of liquid polymer (vacuum distillate), which is more readily converted to the resin than the starting aromatics, is also attained in run 3. It can be observed that the

Table I

| Run No. | 1 | 2 | 3 | 4 | 5 | 6 |
|---|---|---|---|---|---|---|
| Catalyst used | 96.4% $H_2SO_4$ | 96.4% $H_2SO_4$ | 96.4% $H_2SO_4$ | $BF_3$ in 45% sol'n. with diethyl ether. | Conc. $H_2SO_4$ on Super Filtrol Clay (50–50). | Paratoluene Sulfonic Acid Monohydrate. |
| Reaction Mixture: | | | | | | |
| Xylene, gm | 200.0 | 200.0 | 200.0 | 200.0 | 200.0 | 200.0 |
| Paraformaldehyde, gm | 56.8 | 56.8 | 56.8 | 56.8 | 56.8 | 56.8 |
| Active Catalyst, gm | 25.0 | 12.5 | 5.0 | 4.5 | 12.5 | 20. |
| Benzene, ml | | | 50.0 | 50.0 | 50.0 | 50. |
| Reaction Conditions: | | | | | | |
| Temperature, °F.[a] | 212 | 212 | 212 | 212 | 212 | 212. |
| Pressure, p.s.i.g | 0 | 0 | 0 | 0 | 0 | 0. |
| Reaction time, hr | 4 | 4 | 4 | 4 | 4 | 4. |
| Vacuum Distillation Conditions: | | | | | | |
| Distillation temp., °F. | 518 | 518 | 518 | 518 | 518 | 518. |
| Vacuum, mm. Hg | 2–4 | 2–4 | 2–4 | 2–4 | 2–4 | 2–4. |
| Separated water, gm | | | 34.0 | 34.0 | 34.0 | 36.0. |
| Vacuum distillate (fill), percent [b] | 25.6 | 19.6 | 40.9 | 39.8 | 35.9 | 36.6. |
| Product Resin: | | | | | | |
| Resin yield, percent [b] | 63.9 | 56.5 | 62.9 | 54.7 | 31.8 | 50. |
| Softening point, °F.[c] | 177.8 | 145.4 | 203.0 | 182.3 | 169.8 | 166. |
| Gardner color [d] | 14.0 | 13.0 | 10.5 | 9.5 | 12.5 | 10.5. |

[a] Temperature in runs 3, 4, 5, 6 was maintained between 158° and 178° F. for 2–3 hours until nearly all water of condensation was azeotroped, and then at 212° for the balance of the given reaction time.
[b] Based on weight of aromatic plus aldehyde ex water of condensation.
[c] Ring and Ball, ASTM E-28-51t.
[d] Gardner color of 50 wt. percent resin solution in toluene.

50 ml. of benzene added to the reaction mixture removed all of the water of condensation as an azeotrope from the reaction zone in the course of the reaction. It should also be mentioned that the sulfuric acid was cleanly separated from the reaction mixture, that there was no emulsification difficulties in the washing steps, and that there was no formaldehyde charring. Runs 4, 5, and 6 show the performance of alternative catalysts under the same conditions as run 3. Each of these catalysts gives results superior to those obtained under comparative tests using much greater quantities of catalyst in the absence of any azeotroping agent. For example, it was necessary to use 2.5 times as much $BF_3$-ether solution without azeotropic distillation to obtain similar resin yields to that of run 4 under otherwise similar conditions. Paratoluene sulfonic acid has been found to be an unobviously advantageous catalyst in this aromatic-aldehyde reaction, as seen in run 6, in that good resin and liquid polymer yields are attained, while, at the same time, the catalyst is easily crystallized out in good yield from the polymerization mixture and can be filtered off pure, i.e., in this example, 15 of the 20 grams of original sulfonic acid crystallized out and was suitable for immediate reuse.

EXAMPLE II

Phosphoric acid has been known as an active catalyst in the reaction of aromatics with aldehydes but always in its dilute form, usually in concentrations less than 85%. This catalyst is not very active, however, and has not been widely used. By contrast, it has now been found that, for this invention, 100% phosphoric acid is far more active than previously used 85% acid, and in some respects, such as resulting product color, it is superior to the other preferred catalysts such as sulfuric acid. Under azeotropic conditions of this invention similar to run 3 of Example I, 85% phosphoric acid results in only a trace of product resin. However, when 100% phosphoric acid is used, resin yields equivalent to those when sulfuric acid is used as the catalyst are obtained, i.e., >60%. Much less phosphoric acid is required to obtain equal yields when operating under the conditions of run 3 (about 10 grams $H_3PO_4$) than when operating under the conditions of run 1 (about 50 grams H₃PO₄). Thus, not only has it been found that 100% phosphoric acid is quite surprisingly effective in the known aromatic-aldehyde condensation reactions, but also that its quantitative requirement is beneficially reduced by the present invention.

EXAMPLE III

In this example the production of an especially advantageous and novel resin is described, using burene as the aromatic and reacting it with formaldehyde under conditions similar to run 3 of Example I, i.e., using benzene as an azeotroping agent. In this case, the reaction mixture becomes a solid mass after about 15 minutes. Much less catalyst is required than in the absence of the azeotroping technique, and a superior resin is obtained. The softening point of this new durene-formaldehyde resin is seen to be greater than 600° F., thus giving it many valuable uses such as in insulating materials, floor tile, etc. The resin is insoluble in lower alcohols, dioxane, acetone, dimethyl formaldehyde and other paraffinic and oxygen containing compounds and partly soluble in benzene, toluene, xylene, aromatic naphtha solvents such as Solvesso 100 and other aromatic type solvents. It is very inert to chemical reagents including strong acids and bases.

Having thus described the general nature and illustrative embodiments of the present invention, the true scope is now particularly pointed out in the appended claims.

Unless otherwise designated all percentages recited herein refer to weight percent.

What is claimed is:

1. In a process for manufacturing resins in which an aromatic hydrocarbon is condensed with an aldehyde in the presence of an acid catalyst selected from the group consisting of sulfuric acid, aryl sulfonic acids, sulfonated polystyrene, formic acid, zinc chloride in acetic acid, hydrofluoric acid, hydrochloric acid, boron trifluoride, boron trifluoride etherate, aluminum chloride, ferric chloride, phosphoric acid, and acidic clays, the improvement which comprises admixing alkyl substituted aromatics of 1 to 3 rings having 1 to 4 alkyl substituents per ring and up to about 4 carbon atoms per substituent with an aldehyde and 1 to 20 weight percent, based on total reactive charge, of an inert water-azeotroping agent selected from the group consisting of $C_1$ to $C_3$ chlorinated hydrocarbons, polychlorinated aromatic hydrocarbons, saturated cyclic and acyclic hydrocarbons, cyclic and acylic ethers, and benzene, and maintaining the resulting mixture in liquid form at a reaction temperature in the range of 75° to 212° F. in the presence of said catalyst while continuously removing an azeotropic vapor mixture of water and said azeotroping agent from the liquid reaction mixture as the reaction proceeds.

2. A process in accordance with claim 1 wherein said catalyst is sulfuric acid.

3. A process in accordance with claim 1 wherein said catalyst is $BF_3$.

4. A process in accordance with claim 1 wherein said azeotroping agent is benzene.

5. In a continuous process for manufacturing resins in which an aromatic hydrocarbon is condensed with an aldehyde in the presence of an acid catalyst selected from the group consisting of sulfuric acid, aryl sulfonic acids, sulfonated polystyrene, formic acid, zinc chloride in acetic acid, hydrofluoric acid, hydrochloric acid, boron trifluoride, boron trifluoride etherate, aluminum chloride, ferric chloride, phosphoric acid, and acidic clays, the improvement which comprises admixing an alkyl substituted benzene having 1 to 4 alkyl substituents of up to about 4 carbon atoms each with an aldehyde in a 5:1 to 1:5 hydrocarbon to aldehyde ratio and 1 to 20 weight percent, based on the total reactive charge, of azeotroping agent selected from the group consisting of $C_1$ to $C_3$ polychlorinated aromatic hydrocarbons, saturated cyclic and acyclic hydrocarbons, cyclic and acyclic ethers, and benzene, and maintaining the mixture in the presence of 0.2 to 20 weight percent, based on the total reactive charge, of said catalyst in a reaction zone at a temperature between 120° and 212° F. until a resinous condensation product is formed, continuously removing the water of condensation and the azeotroping agent from the reaction zone as the reaction proceeds and recycling said azeotroping agent, separating the acid phase from the hydrocarbon phase in a separation zone and recycling said acid to the reaction zone, distilling the unreacted aromatics from said hydrocarbon phase in an atmospheric distillation zone and recycling said unreacted aromatics to the reaction zone, and separating the product resin from the resulting residue.

References Cited in the file of this patent

UNITED STATES PATENTS

| | | |
|---|---|---|
| 898,307 | Bohn | Sept. 8, 1908 |
| 2,200,762 | Anderson et al. | May 14, 1940 |
| 2,200,763 | Anderson et al. | May 14, 1940 |
| 2,322,870 | Molinari | June 29, 1943 |
| 2,382,184 | Thompson | Aug. 14, 1945 |
| 2,395,739 | Hersburger | Feb. 26, 1946 |
| 2,597,159 | May et al. | May 20, 1952 |

FOREIGN PATENTS

| | | |
|---|---|---|
| 547,897 | Great Britain | Sept. 16, 1942 |

OTHER REFERENCES

Doolittle: The Tech. of Solvents and Plast. 1954, p. 434, published by John Wiley & Sons, Inc., New York.